(12) United States Patent
Kobayashi et al.

(10) Patent No.: US 9,812,912 B2
(45) Date of Patent: Nov. 7, 2017

(54) ROTOR FOR PERMANENT MAGNET MOTOR HAVING A MAGNETIC POLE PORTION AND A FIELD PORTION

(71) Applicant: Mitsubishi Electric Corporation, Tokyo (JP)

(72) Inventors: Hiroki Kobayashi, Tokyo (JP); Kentaro Horisaka, Tokyo (JP); Kenta Ozaki, Tokyo (JP); Koki Naka, Tokyo (JP); Hisashi Otsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/125,981

(22) PCT Filed: Mar. 18, 2014

(86) PCT No.: PCT/JP2014/057411
§ 371 (c)(1),
(2) Date: Sep. 14, 2016

(87) PCT Pub. No.: WO2015/140941
PCT Pub. Date: Sep. 24, 2015

(65) Prior Publication Data
US 2017/0098971 A1    Apr. 6, 2017

(51) Int. Cl.
*H02K 1/27* (2006.01)
(52) U.S. Cl.
CPC ......... *H02K 1/2713* (2013.01); *H02K 1/2706* (2013.01); *H02K 1/2753* (2013.01)

(58) Field of Classification Search
CPC ...... H02K 1/27; H02K 1/2713; H02K 1/2753; H02K 1/2706; H02K 1/2726; H02K 1/28; H02K 21/14
(Continued)

(56) References Cited

U.S. PATENT DOCUMENTS 6,144,132 A    11/2000    Nashiki
6,940,205 B1    9/2005    Murakami et al.
(Continued)

FOREIGN PATENT DOCUMENTS

DE    102015111480 A1    1/2017
EP    2639936 A1    9/2013
(Continued)

OTHER PUBLICATIONS

Machine translation of JP 2008029130 A (Feb. 2008).*
(Continued)

*Primary Examiner* — Michael Andrews
(74) *Attorney, Agent, or Firm* — Sughrue Mion, PLLC; Richard C. Turner

(57) ABSTRACT

A rotor for a permanent magnet motor, includes a magnetic pole portion that includes a magnetic body formed in an annular shape; and a field portion that is disposed adjacent to the magnetic pole portion in an axial direction, that includes a permanent magnet formed in an annular shape and having a multipole structure or a plurality of permanent magnets formed in an annular shape and having a monopole structure and a magnetic body, and that causes a magnetic flux generated by the permanent magnet to flow in the axial direction so as to generate magnetic poles on an outer circumferential surface of the magnetic pole portion.

17 Claims, 6 Drawing Sheets

(58) Field of Classification Search
USPC ............ 310/156.01, 156.28, 156.29, 156.36, 310/156.37, 156.61, 156.64
See application file for complete search history.

(56) References Cited

U.S. PATENT DOCUMENTS

| | | | |
|---|---|---|---|
| 7,053,508 | B2 | 5/2006 | Kusase et al. |
| 7,233,092 | B2 | 6/2007 | Murakami et al. |
| 7,408,279 | B2 | 8/2008 | Murakami et al. |
| 7,411,329 | B2 | 8/2008 | Murakami et al. |
| 8,446,054 | B2 | 5/2013 | Toyota et al. |
| 2005/0285468 | A1 | 12/2005 | Fukushima et al. |
| 2010/0207475 | A1* | 8/2010 | Kawasaki ............... H02K 1/278 310/156.08 |
| 2010/0231079 | A1* | 9/2010 | Abe ..................... H02K 1/2793 310/156.35 |
| 2012/0139379 | A1 | 6/2012 | Ge et al. |
| 2013/0241335 | A1 | 9/2013 | Vollmer |

FOREIGN PATENT DOCUMENTS

| | | | |
|---|---|---|---|
| JP | 7-154935 A | 6/1995 | |
| JP | 10-243623 A | 9/1998 | |
| JP | 11-146584 A | 5/1999 | |
| JP | 2000-50544 A | 2/2000 | |
| JP | 2004-350427 A | 12/2004 | |
| JP | 2006-222131 A | 8/2006 | |
| JP | 2007-14199 A | 1/2007 | |
| JP | 2007-282325 A | 10/2007 | |
| JP | 2008-29130 A | 2/2008 | |
| JP | 2008029130 A * | 2/2008 | ............ H02K 21/14 |
| JP | 2009-38930 A | 2/2009 | |
| JP | 2010-193609 A | 9/2010 | |
| JP | 2010-213455 A | 9/2010 | |
| JP | 2011-24379 A | 2/2011 | |

OTHER PUBLICATIONS

Taiwanese Notification of Reasons for Refusal for TW 103132595 dated Sep. 25, 2015.
International Search Report for PCT/JP2014/057411 dated May 27, 2014.
Communication dated Mar. 14, 2017 from the State Intellectual Property Office of the P.R.C. in counterpart Application No. 201480077197.7.
Communication dated May 24, 2017 by the German Patent and Trademark Office in counterpart German Patent Application No. 112014006360.6.
Communication dated Aug. 7, 2017, from State Intellectual Property Office of the P.R.C. in counterpart application No. 201480077197.7.

* cited by examiner

ROTOR FOR PERMANENT MAGNET MOTOR HAVING A MAGNETIC POLE PORTION AND A FIELD PORTION

CROSS REFERENCE TO RELATED APPLICATIONS

This application is a National Stage of International Application No. PCT/JP2014/057411filed Mar. 18, 2014, the contents of which are incorporated herein by reference in their entirety.

FIELD

The present invention relates to a rotor for a permanent magnet motor.

BACKGROUND

A conventional rotor for a claw-pole motor has been disclosed that generates N and S magnetic poles on the surfaces of first and second claw-pole magnetic bodies by using an annular permanent magnet that is magnetized in the axial direction (see, for example, Patent Literature 1).

Furthermore a conventional rotor for a hybrid stepping motor has been disclosed that consists of a cylindrical permanent magnet magnetized in the axial direction; two rotor magnetic bodies formed by stacking steel plates on both sides of the permanent magnet in the axial direction and fixed to hold the permanent magnet therebetween; and a shaft penetrating the permanent magnet and the rotor magnetic bodies (see, for example, Patent Literature 2).

Further, a conventional rotor for a permanent magnet motor has been disclosed that generates N and S magnetic poles on the surface of a magnetic body between permanent magnets by magnetizing permanent magnets between 2Z slots in the axial direction (see, for example, Patent Literature 3).

The techniques disclosed in Patent Literatures 1 to 3 described above all employ a rotor structure that causes magnetic fluxes generated by permanent magnets to flow in the axial direction so as to generate N and S magnetic poles on the surface of the rotor magnetic body. This structure causes magnetic fluxes of the stator to flow through the inside of the rotor magnetic body, which has a low magnetic resistance, instead of flowing through the permanent magnets. This structure can therefore reduce a reverse magnetic field to the permanent magnets, prevent demagnetization of the permanent magnets, and improve demagnetization resistance of the permanent magnets.

CITATION LIST

Patent Literatures

Patent Literature 1: Japanese Patent Application Laid-open No. 2010-213455 (FIG. 2)
Patent Literature 2: Japanese Patent Application Laid-open No. H10-243623 (FIG. 7)
Patent Literature 3: Japanese Patent Application Laid-open No. H07-154935 (FIG. 8)

SUMMARY

Technical Problem

According to the conventional techniques disclosed in Patent Literatures 1 to 3 described above, magnetic fluxes generated by permanent magnets flow in the axial direction so as to generate N and S magnetic poles on the surface of the rotor magnetic body; therefore, it is possible to prevent demagnetization of the permanent magnets and to improve demagnetization resistance of the permanent magnets. However, there is a problem in that the structure of a magnetic body for generating N and S magnetic poles alternately in the circumferential direction on the surface of the rotor magnetic body is complicated and thus difficult to manufacture.

The present invention has been achieved in view of the above problems, and an object of the present invention is to provide a rotor for a permanent magnet motor that reduces a reverse magnetic field to permanent magnets, prevents demagnetization of the permanent magnets, and improves demagnetization resistance of the permanent magnets while having a simplified structure.

Solution to Problem

In order to solve the above problems and achieve the object, an aspect of the present invention is a rotor for a permanent magnet motor, including: a magnetic pole portion that includes a magnetic body formed in an annular shape; and a field portion that is disposed adjacent to the magnetic pole portion in an axial direction, that includes a permanent magnet formed in an annular shape and having a multipole structure or a plurality of permanent magnets formed in an annular shape and having a monopole structure and a magnetic body, and that causes a magnetic flux generated by the permanent magnet to flow in the axial direction so as to generate magnetic poles on an outer circumferential surface of the magnetic pole portion.

Advantageous Effects of Invention

In the rotor for a permanent magnet motor according to the present invention, magnetic fluxes generated by the stator and then having flowed into the rotor, flow through the inside of the magnetic body of the rotor, which has a low magnetic resistance, instead of flowing through the permanent magnets; therefore, it is possible to reduce a reverse magnetic field to the permanent magnets and to prevent demagnetization of the permanent magnets. Further, the field portion overall has a multipole structure; therefore, an effect is obtained where it is possible to simplify the structure of the magnetic body for generating N and S magnetic poles alternately in the circumferential direction on the surface of the magnetic body of the rotor.

DESCRIPTION OF EMBODIMENTS

Exemplary embodiments of a rotor for a permanent magnet motor according to the present invention will be explained below in detail with reference to the accompanying drawings. The present invention is not limited to the embodiments.

First Embodiment

Figure 1:
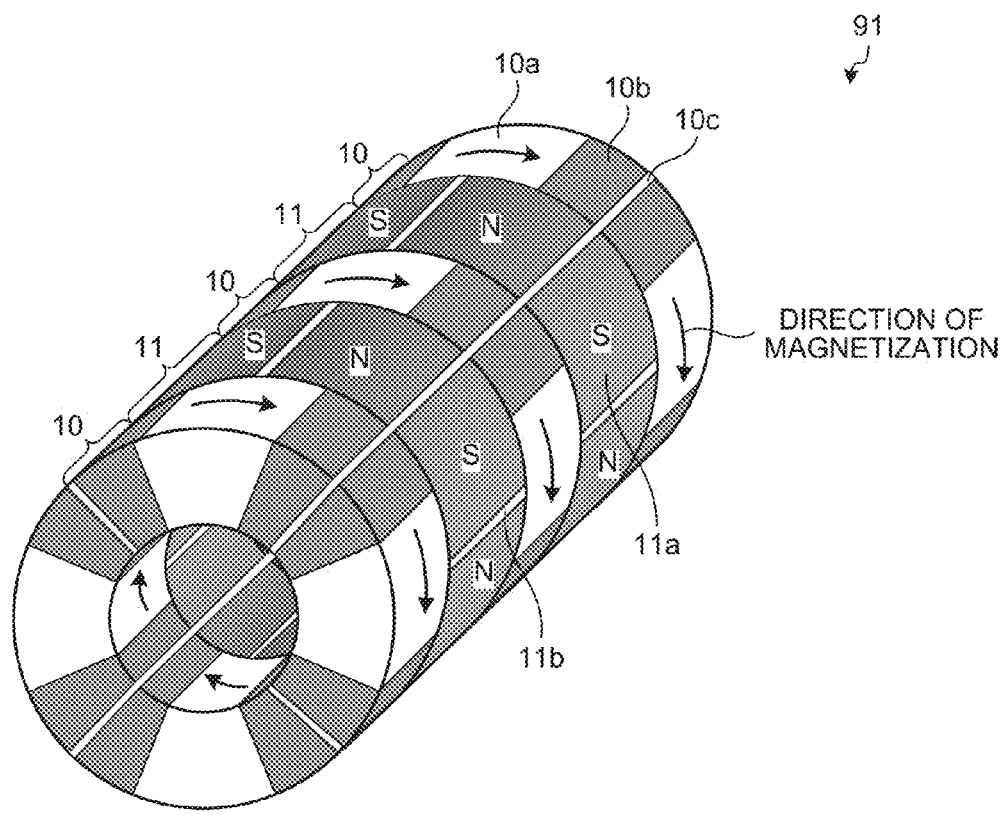
FIG. 1 is a perspective view illustrating a rotor for a permanent magnet motor according to a first embodiment of the present invention.
Figure 2:
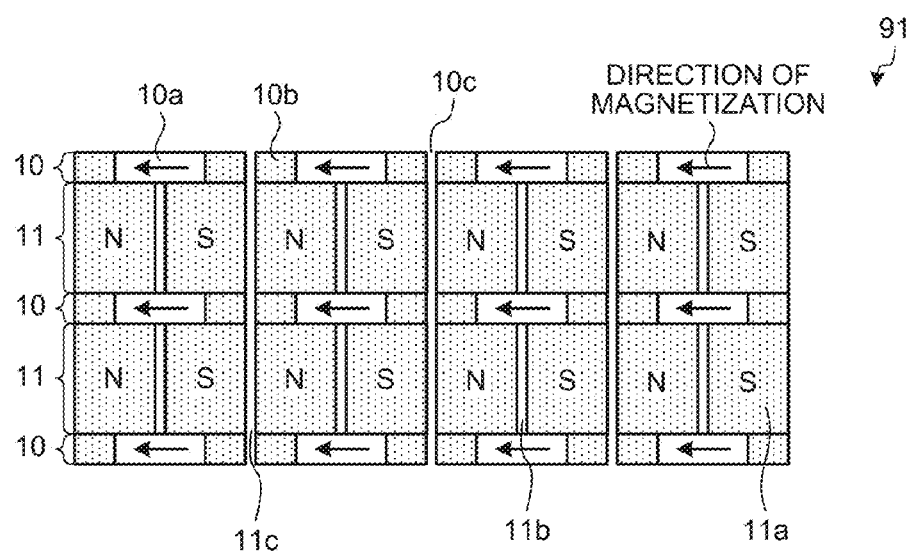
FIG. 2 is a developed view of an outer circumferential portion of the rotor for a permanent magnet motor according to the first embodiment.

FIG. 1 is a perspective view illustrating a rotor for a permanent magnet motor according to a first embodiment of the present invention, and FIG. 2 is a developed view of an outer circumferential portion of the rotor for a permanent magnet motor according to the first embodiment. As illustrated in FIGS. 1 and 2, a rotor 91 for a permanent magnet motor according to the first embodiment includes three field portions 10, which are formed in an annular shape and disposed at both ends and at the central portion in the axial direction, and two magnetic pole portions 11, which are formed in an annular shape, have the same inner and outer diameters as those of the field portions 10, and are disposed between the field portions 10. The field portions 10 and the magnetic pole portions 11 are disposed adjacent to each other in the axial direction.

The field portion 10 includes four fan-shaped permanent magnets 10a, which are magnetized in the same circumferential direction and are disposed at equal intervals in the circumferential direction, and eight fan-shaped magnetic bodies 10b, which are disposed at both ends of the permanent magnets 10a in the circumferential direction. A field-portion slit 10c in the axial direction is formed between two magnetic bodies 10b that are adjacent to each other in the circumferential direction. The field portion 10 according to the first embodiment is a field portion that is formed in an annular shape and includes a plurality of permanent magnets 10a having a monopole structure and magnetic bodies 10b.

The magnetic pole portion 11 includes eight fan-shaped magnetic bodies 11a, which are disposed at equal intervals in the circumferential direction. A magnetic-pole portion slit 11b or 11c in the axial direction is formed between two magnetic bodies 11a that are adjacent to each other in the circumferential direction. The magnetic-pole portion slit 11c has the same phase as that of the field-portion slit 10c between the two adjacent magnetic bodies 10b.

Magnetic fluxes generated at the field portions 10 flow to the magnetic pole portions 11 in the axial direction so as to generate S and N magnetic poles alternately in the circumferential direction on the outer circumferential surfaces of the fan-shaped magnetic bodies 11a.

Although not illustrated in the drawings, it is preferable that flat plate-shaped permanent magnets magnetized in the same circumferential direction as that of the permanent magnets 10a are disposed in the magnetic-pole portion slits 11b and that flat plate-shaped permanent magnets magnetized in the opposite circumferential direction to that of the permanent magnets 10a are disposed in the magnetic-pole portion slits 11c. That is, flat plate-shaped permanent magnets that are magnetized in the circumferential direction to face toward the magnetic bodies 11a generating an N magnetic pole are disposed in the magnetic-pole portion slits 11b and 11c. By disposing the permanent magnets in the magnetic-pole portion slits 11b and 11c, it is possible to generate stronger S and N magnetic poles.

Second Embodiment

Figure 3:
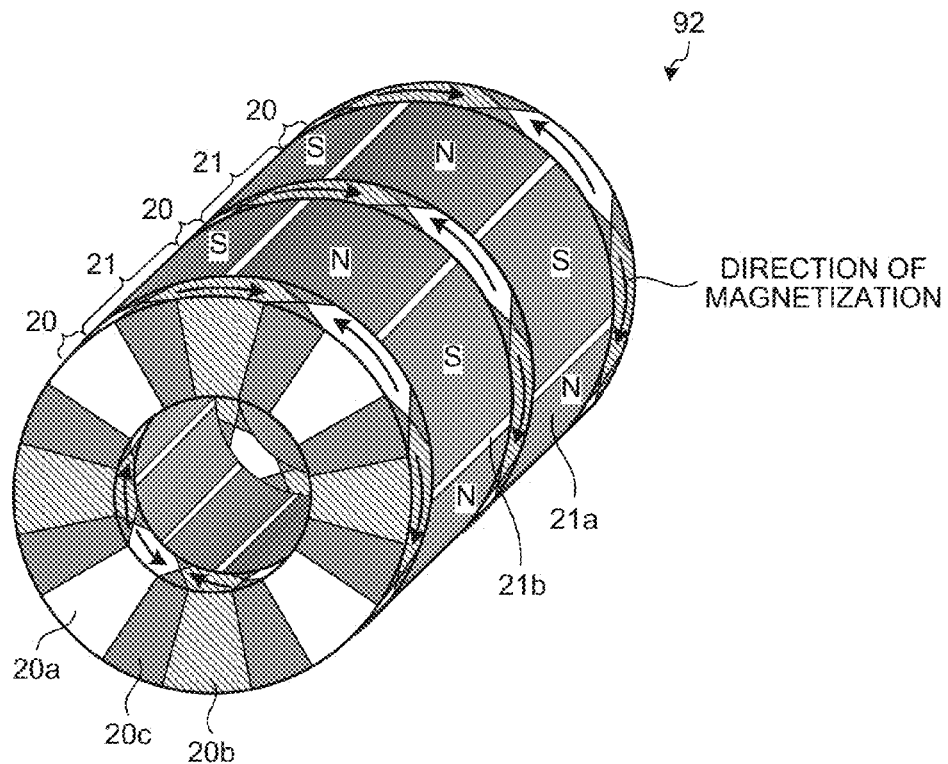
FIG. 3 is a perspective view illustrating a rotor for a permanent magnet motor according to a second embodiment of the present invention.
Figure 4:
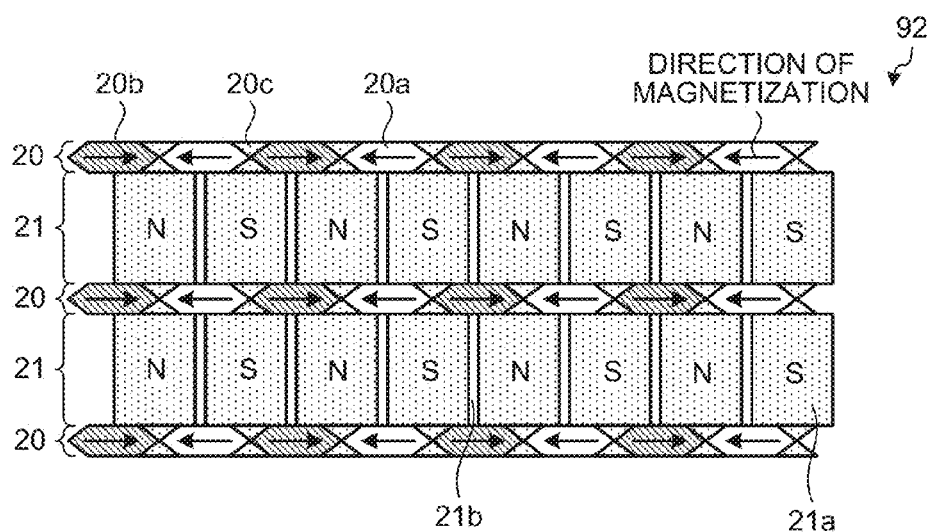
FIG. 4 is a developed view of an outer circumferential portion of the rotor for a permanent magnet motor according to the second embodiment.

FIG. 3 is a perspective view illustrating a rotor for a permanent magnet motor according to a second embodiment of the present invention, and FIG. 4 is a developed view of an outer circumferential portion of the rotor for a permanent magnet motor according to the second embodiment. As illustrated in FIGS. 3 and 4, a rotor 92 for a permanent magnet motor according to the second embodiment includes three field portions 20, which are formed in an annular shape and disposed at both ends and at the central portion in the axial direction, and two magnetic pole portions 21, which are formed in an annular shape, have the same inner and outer diameters as those of the field portions 20, and are disposed between the field portions 20. The field portions 20 and the magnetic pole portions 21 are disposed adjacent to each other in the axial direction.

The field portion 20 includes a total of eight fan-shaped permanent magnets 20a and 20b, which each have a wedge shape at both ends in the circumferential direction, which are magnetized in the circumferential direction in such a manner that the directions of magnetization are alternately opposite to each other, and which are disposed at equal intervals in the circumferential direction. The field portion 20 also includes a total of sixteen magnetic bodies 20c in a triangular prism shape, disposed at both ends of the permanent magnets 20a and 20b in the circumferential direction. The field portion 20 according to the second embodiment is a field portion that is formed in an annular shape and includes the permanent magnets 20a and 20b having a multipole structure.

The magnetic pole portion 21 includes eight fan-shaped magnetic bodies 21a, which are disposed at equal intervals in the circumferential direction. Magnetic-pole portion slits 21b in the axial direction are formed between the magnetic bodies 21a that are adjacent to each other. The magnetic-pole portion slits 21b are disposed at the central portions of the permanent magnets 20a and 20b in the circumferential direction.

Magnetic fluxes generated at the field portions 20 flow to the magnetic pole portions 21 in the axial direction so as to generate S and N magnetic poles alternately in the circumferential direction on the outer circumferential surfaces of the fan-shaped magnetic bodies 21a.

Although not illustrated in the drawings, it is preferable that flat plate-shaped permanent magnets that are each magnetized in the same circumferential direction as that of the permanent magnet 20a or 20b of the same phase are disposed in the magnetic-pole portion slits 21b. That is, flat plate-shaped permanent magnets that are magnetized in the circumferential direction to face toward the magnetic bodies 21a generating an N magnetic pole are disposed in the magnetic-pole portion slits 21b. By disposing the permanent magnets in the magnetic-pole portion slits 21b, it is possible to generate stronger S and N magnetic poles.

Third Embodiment

Figure 5:
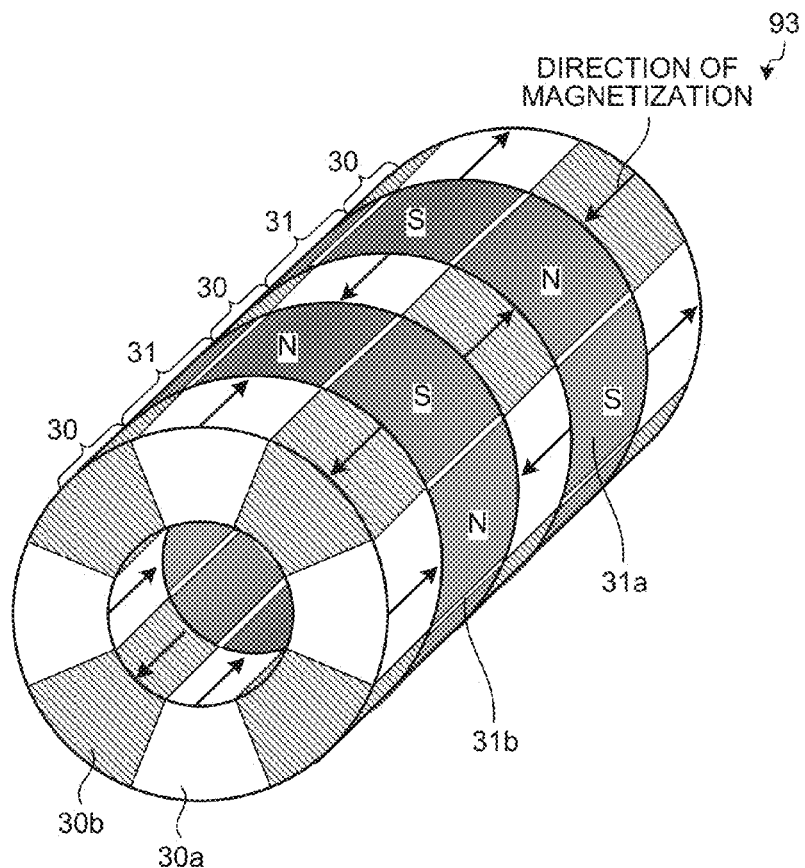
FIG. 5 is a perspective view illustrating a rotor for a permanent magnet motor according to a third embodiment of the present invention.
Figure 6:
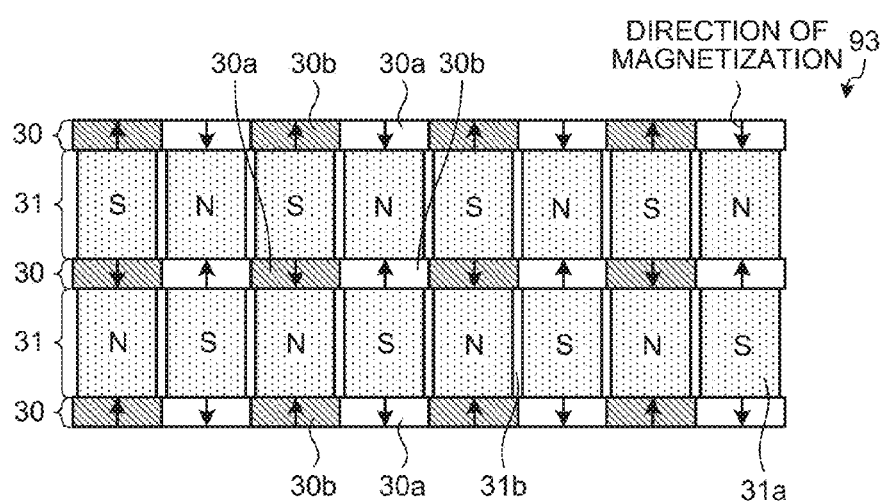
FIG. 6 is a developed view of an outer circumferential portion of the rotor for a permanent magnetic motor according to the third embodiment.

FIG. 5 is a perspective view illustrating a rotor for a permanent magnet motor according to a third embodiment of the present invention, and FIG. 6 is a developed view of an outer circumferential portion of the rotor for a permanent magnetic motor according to the third embodiment. As illustrated in FIGS. 5 and 6, a rotor 93 for a permanent magnet motor according to the third embodiment includes three field portions 30, which are formed in an annular shape and disposed at both ends and at the central portion in the axial direction, and two magnetic pole portions 31, which are formed in an annular shape, have the same inner and outer diameters as those of the field portions 30, and are disposed between the field portions 30. The field portions 30 and the magnetic pole portions 31 are disposed adjacent to each other in the axial direction.

The field portion 30 includes a total of eight fan-shaped permanent magnets 30a and 30b, which are magnetized in the axial direction in such a manner that the directions of magnetization alternate and which are disposed at equal intervals in the circumferential direction without any gap therebetween. Two permanent magnets 30a of the same phase that are disposed at both ends in the axial direction are magnetized in one axial direction, and one permanent magnet 30b of the same phase disposed at the central portion in the axial direction is magnetized in the other axial direction. Two permanent magnets 30b of the same phase that are disposed adjacent to the aforementioned two permanent magnets 30a of the same phase disposed at both ends in the axial direction are magnetized in the other axial direction, and one permanent magnet 30a of the same phase disposed at the central portion in the axial direction is magnetized in the one axial direction. The field portion 30 according to the third embodiment is a field portion that is formed in an annular shape and includes the permanent magnets 30a and 30b having a multipole structure.

The magnetic pole portion 31 includes eight arc-shaped magnetic bodies 31a, which are disposed at equal intervals in the circumferential direction. Magnetic-pole portion slits 31b in the axial direction are formed between the magnetic bodies 31a that are adjacent to each other in the circumferential direction. The magnetic-pole portion slits 31b are disposed at the ends of the permanent magnets 30a and 30b in the circumferential direction.

Magnetic fluxes generated at the field portions 30 flow to the magnetic pole portions 31 in the axial direction so as to generate S and N magnetic poles alternately in the circumferential direction on the outer circumferential surfaces of the magnetic bodies 31a. In the two magnetic pole portions 31, S and N magnetic poles of two magnetic bodies 31a of the same phase are different from each other.

Although not illustrated in the drawings, it is preferable that flat plate-shaped permanent magnets that are magnetized in the circumferential direction to face toward the magnetic bodies 31a of the magnetic pole portions 31 generating an N magnetic pole are disposed in the magnetic-pole portion slits 31b. By disposing the permanent magnets in the magnetic-pole portion slits 31b, it is possible to generate stronger S and N magnetic poles.

Fourth Embodiment

Figure 7:
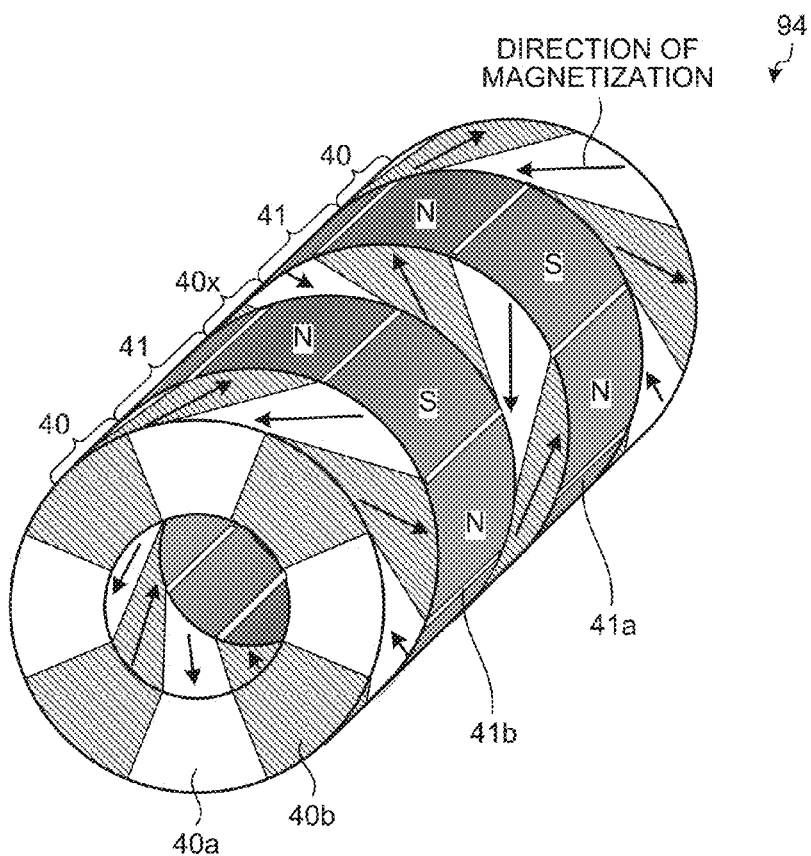
FIG. 7 is a perspective view illustrating a rotor for a permanent magnet motor according to a fourth embodiment of the present invention.
Figure 8:
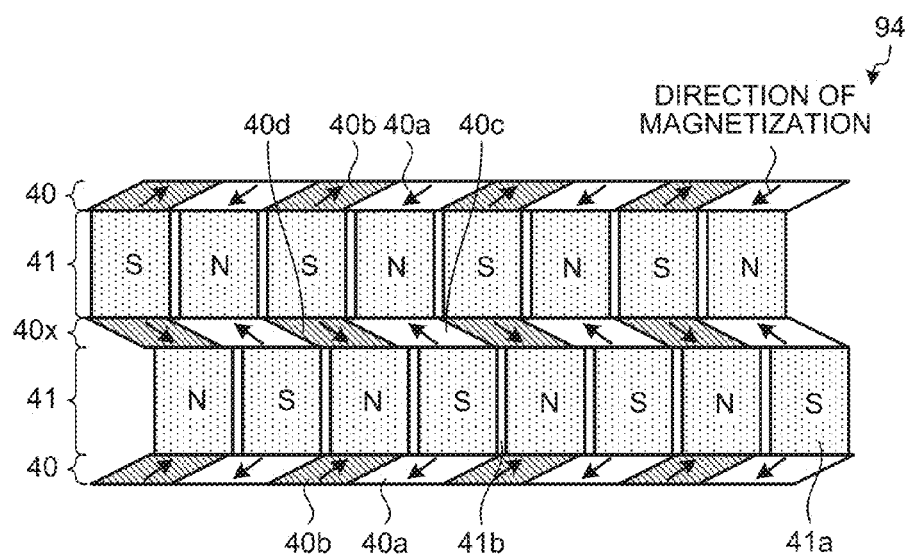
FIG. 8 is a developed view of an outer circumferential portion of the rotor for a permanent magnet motor according to the fourth embodiment.

FIG. 7 is a perspective view illustrating a rotor for a permanent magnet motor according to a fourth embodiment of the present invention, and FIG. 8 is a developed view of an outer circumferential portion of the rotor for a permanent magnet motor according to the fourth embodiment. As illustrated in FIGS. 7 and 8, a rotor 94 for a permanent magnet motor according to the fourth embodiment includes two field portions 40, which are formed in an annular shape and disposed at both ends in the axial direction; one field portion 40x, which is disposed at the central portion in the axial direction; and two magnetic pole portions 41, which are formed in an annular shape, have the same inner and outer diameters as those of the field portions 40 and 40x, and are disposed between the field portions 40 and 40x. The field portions 40 and 40x and the magnetic pole portions 41 are disposed adjacent to each other in the axial direction.

The field portion 40 includes eight fan-shaped permanent magnets 40a and 40b, which are magnetized in one oblique direction with respect to the axial direction in such a manner that the directions of magnetization alternate and which are disposed at equal intervals in the circumferential direction without any gap. The field portion 40x includes eight fan-shaped permanent magnets 40c and 40d, which are magnetized in another oblique direction with respect to the axial direction in such a manner that the directions of magnetization alternate and which are disposed at equal intervals in the circumferential direction without any gap. The permanent magnets 40a, 40b, 40c, and 40d according to the fourth embodiment are each formed to have an inclined shape in such a manner that the phase on one side and the phase on the other side in the axial direction are shifted by a half pitch. The field portions 40 and 40x according to the fourth embodiment are field portions that are formed in an annular shape and include the permanent magnets 40a and 40b or 40c and 40d having a multipole structure.

The magnetic pole portion 41 includes eight fan-shaped magnetic bodies 41a, which are disposed at equal intervals in the circumferential direction. Magnetic-pole portion slits 41b in the axial direction are formed between adjacent fan-shaped magnetic bodies 41a in the circumferential direction. The magnetic-pole portion slits 41b are disposed such that they are located at the ends of the permanent magnets 40a, 40b, 40c, and 40d in the circumferential direction. Two magnetic pole portions 41 are disposed such that the phases of the magnetic bodies 41a are shifted by a half pitch.

Magnetic fluxes generated at the field portions 40 and 40x flow in the axial direction to the magnetic pole portions 41 so as to generate S and N magnetic poles alternately in the circumferential direction on the outer circumferential surfaces of the magnetic bodies 41a. In the two magnetic pole portions 41, the S and N magnetic poles of the two magnetic bodies 41a of the phases shifted by a half pitch are different from each other.

Although not illustrated in the drawings, it is preferable that flat plate-shaped permanent magnets that are magnetized in the circumferential direction to face toward the magnetic bodies 41a of the magnetic pole portions 41 generating an N magnetic pole are disposed in the magnetic-pole portion slits 41b. By disposing the permanent magnets in the magnetic-pole portion slits 41b, it is possible to generate stronger S and N magnetic poles.

Fifth Embodiment

Figure 9:
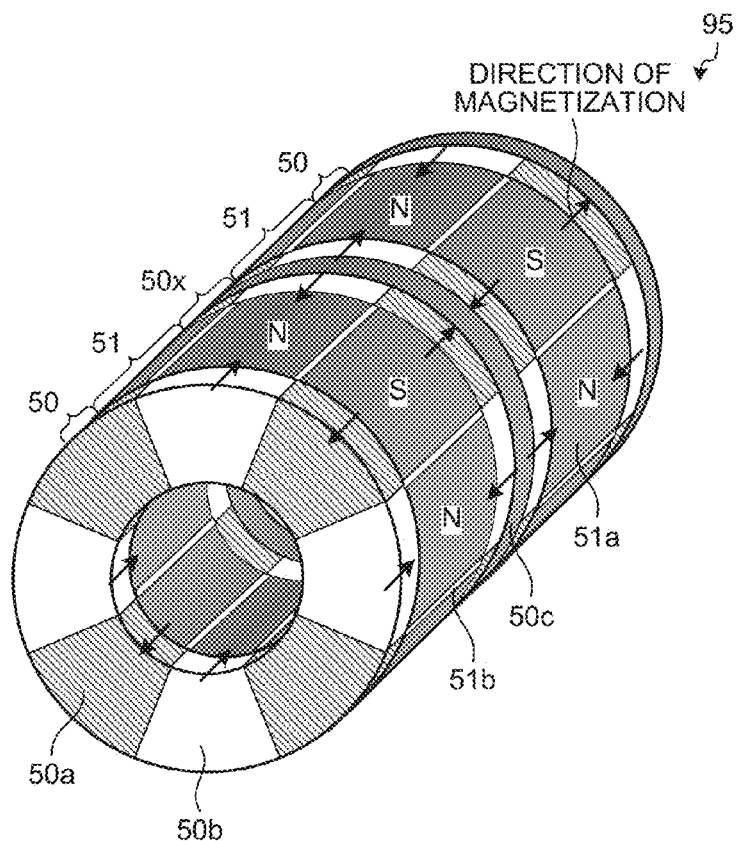
FIG. 9 is a perspective view illustrating a rotor for a permanent magnet motor according to a fifth embodiment of the present invention.
Figure 10:
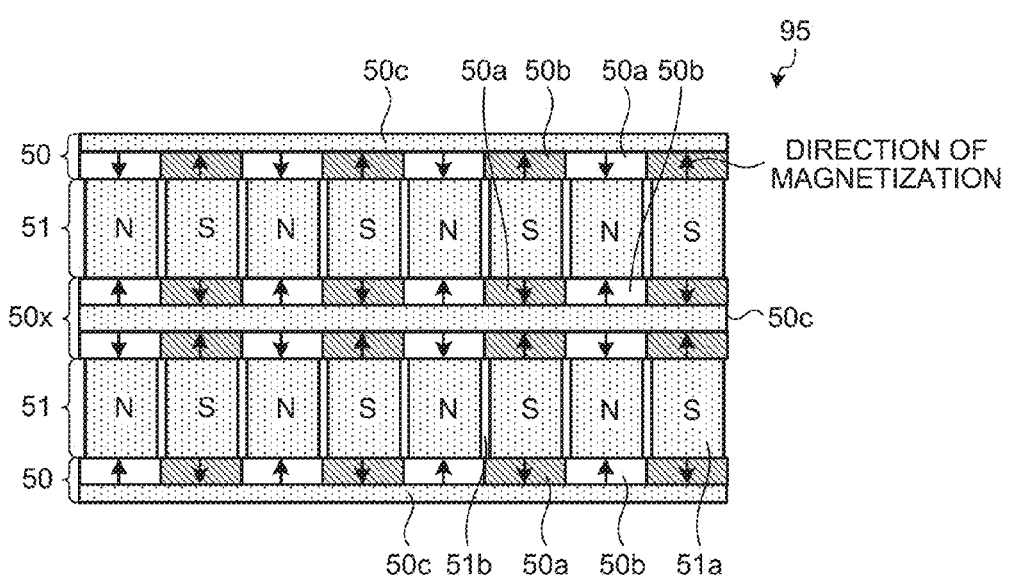
FIG. 10 is a developed view of an outer circumferential portion of the rotor for a permanent magnet motor according to the fifth embodiment.

FIG. 9 is a perspective view illustrating a rotor for a permanent magnet motor according to a fifth embodiment of the present invention, and FIG. 10 is a developed view of an outer circumferential portion of the rotor for a permanent magnet motor according to the fifth embodiment. As illustrated in FIGS. 9 and 10, a rotor 95 for a permanent magnet motor according to the fifth embodiment includes first field portions 50, which are formed in an annular shape and disposed at both ends in the axial direction; a second field portion 50x, which is disposed at the central portion in the axial direction; and two magnetic pole portions 51, which are formed in an annular shape, have the same inner and outer diameters as those of the first and second field portions 50 and 50x, and are disposed between the first and second field portions 50 and 50x. The first and second field portions 50 and 50x and the magnetic pole portions 51 are disposed adjacent to each other in the axial direction.

The first field portion 50 includes a total of eight fan-shaped permanent magnets 50a and 50b, which are magnetized in the axial direction in such a manner that the directions of magnetization are alternately opposite to each other and which are disposed at equal intervals in the circumferential direction without any gap. The permanent magnets 50a are magnetized in one axial direction, and the permanent magnets 50b are magnetized in the other axial direction. Annular magnetic bodies 50c are disposed on the outer side of the permanent magnets 50a and 50b in the axial direction. The annular magnetic bodies 50c and the permanent magnets 50a and 50b constitute the first field portion 50. The field portions 50 and 50x according to the fifth embodiment are field portions that are formed in an annular shape and include the permanent magnets 50a and 50b having a multipole structure.

The second field portion 50x disposed at the central portion in the axial direction (between the two magnetic pole portions 51) includes the annular magnetic body 50c and a total of sixteen fan-shaped permanent magnets 50a and 50b, which are disposed on both sides of the magnetic body 50c to be adjacent thereto, which are magnetized in the axial direction in such a manner that the directions of magnetization are alternately opposite to each other, and which are disposed at equal intervals in the circumferential direction without any gap. When the permanent magnets are disposed in the order 50a, 50b, 50a, and 50b from one end to the other end in the axial direction in the same phase, the permanent magnets are disposed in the adjacent same phase in the order 50b, 50a, 50b, and 50a from the one end to the other end in the axial direction. The annular magnetic bodies 50c are provided to allow magnetic fluxes generated by the permanent magnets 50a and 50b to pass therethrough.

The magnetic pole portion 51 includes eight fan-shaped magnetic bodies 51a, which are disposed at equal intervals in the circumferential direction. Magnetic-pole portion slits 51b in the axial direction are formed between the magnetic bodies 51a that are adjacent to each other in the circumferential direction. The magnetic-pole portion slits 51b are disposed at the ends of the permanent magnets 50a and 50b in the circumferential direction.

Magnetic fluxes generated at the first and second field portions 50 and 50x flow in the axial direction to the magnetic pole portions 51 so as to generate S and N magnetic poles alternately in the circumferential direction on the outer circumferential surfaces of the magnetic bodies 51a. In the two magnetic pole portions 51, the S and N magnetic poles of the two magnetic bodies 51a of the same phase are the same.

Although not illustrated in the drawings, it is preferable that flat plate-shaped permanent magnets that are magnetized in the circumferential direction to face toward the magnetic bodies 51a of the magnetic pole portions 51 generating an N magnetic pole are disposed in the magnetic-pole portion slits 51b. By disposing the permanent magnets in the slits 51b, it is possible to generate stronger S and N magnetic poles.

Sixth Embodiment

Figure 11:
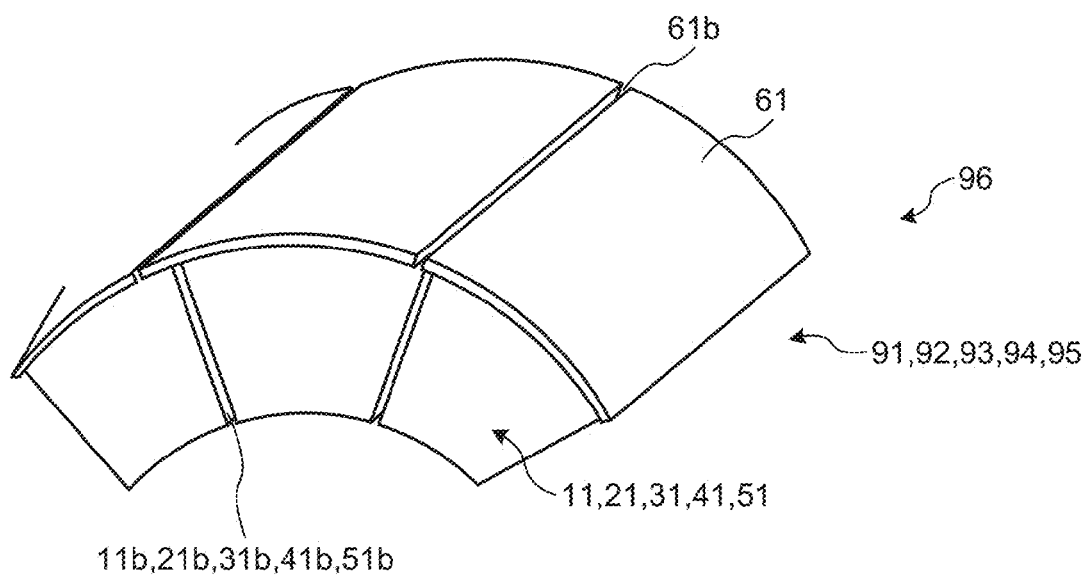
FIG. 11 is a partial perspective view illustrating a rotor for a permanent magnet motor according to a sixth embodiment of the present invention.

FIG. 11 is a partial perspective view illustrating a rotor for a permanent magnet motor according to a sixth embodiment of the present invention. Specifically, FIG. 11 illustrates a removed field portion at one end in the axial direction. As illustrated in FIG. 11, a rotor 96 for a permanent magnet motor according to the sixth embodiment is such that the outer circumferential surface of any of the rotors 91 to 95 for a permanent magnet motor according to the first to fifth embodiments is covered with a plurality of arc-shaped plate-like magnetic bodies 61.

The arc-shaped plate-like magnetic bodies 61 disposed in an annular shape and spaced by outer-circumferential portion slits 61b having the same pitch as the magnetic-pole portion slits 11b, 21b, 31b, 41b, and 51b, are fixed on the outer circumferential surfaces of the magnetic pole portions 11, 21, 31, 41, and 51 and the field portions 10, 20, 30, 40, 40x, 50, and 50x, which are not illustrated in FIG. 11.

The magnetic-pole portion slits 11b, 21b, 31b, 41b, and 51b and the outer-circumferential portion slits 61b are disposed in such a manner that the phases thereof are shifted from each other. The arc-shaped plate-like magnetic body 61 is mostly fixed on the outer circumferential surface of one fan-shaped magnetic body 11a, 21a, 31a, 41a, or 51a, and is partly fixed on a portion of the outer circumferential surface of the adjacent fan-shaped magnetic body 11a, 21a, 31a, 41a, or 51a.

The arc-shaped plate-like magnetic bodies 61 connect the magnetic bodies 11a and 11a to each other, the magnetic bodies 21a and 21a to each other, the magnetic bodies 31a and 31a to each other, the magnetic bodies 41a and 41a to each other, and the magnetic bodies 51a and 51a to each other; therefore, each of the rotors 91, 92, 93, 94, and 95 is integrally formed as one unit. The magnetic body 61 also has a function of causing magnetic fluxes generated at the field portions 10, 20, 30, 40, 40x, 50, and 50x to flow to the magnetic pole portions 11, 21, 31, 41, and 51 in the axial direction.

As described above, with the rotors 91 to 95 for a permanent magnet motor according to the first to sixth embodiments, the magnetic fluxes generated by the stator and then having flowed into the rotors 91 to 95 flow through the inside of the magnetic bodies 11a to 51a of the rotors 91 to 95, which have a low magnetic resistance, instead of flowing through the permanent magnets 10a to 50b. Therefore, a reverse magnetic field to the permanent magnets 10a to 50b is reduced, and thus demagnetization of the permanent magnets 10a to 50b can be prevented. Further, the field portions 10 to 50x overall have a multipole structure; therefore, an effect is obtained where it is possible to simplify the structure of the magnetic bodies 11a to 51a for generating N and S magnetic poles alternately in the circumferential direction on the surfaces of the magnetic bodies 11a to 51a of the rotors 91 to 95.

REFERENCE SIGNS LIST

10, 20, 30, 40, 40x, 50, 50x field portion, 10a, 20a, 20b, 30a, 30b, 40a, 40b, 40c, 40d, 50a, 50b permanent magnet, 10b, 20c magnetic body, 10c field-portion slit, 50c magnetic body, 11, 21, 31, 41, 51 magnetic pole portion, 11a, 21a, 31a, 41a, 51a magnetic body, 11b, 11c, 21b, 31b, 41b, 51b magnetic-pole portion slit, 61 arc-shaped plate-like magnetic body, 61b outer-circumferential portion slit, 91, 92, 93, 94, 95, 96 rotor for permanent magnet motor.

The invention claimed is:

1. A rotor for a permanent magnet motor, comprising:
   a magnetic pole portion that includes a first magnetic body formed in an annular shape; and a field portion that is disposed adjacent to the magnetic pole portion in an axial direction, that includes a permanent magnet formed in an annular shape and having a multipole structure or a plurality of permanent magnets formed in an annular shape and having a monopole structure and a second magnetic body, and that causes a magnetic flux generated by the permanent magnet to flow in the axial direction so as to generate magnetic poles on an outer circumferential surface of the magnetic pole portion, wherein the magnetic pole portion is formed by disposing a plurality of fan-shaped magnetic bodies in an annular shape with a magnetic-pole portion slit being put therebetween, arc-shaped plate-like magnetic bodies that are disposed in an annular shape and are spaced by an outer-circumferential portion slit having a same pitch as the magnetic-pole portion slit are fixed on an outer circumferential surface of the magnetic pole portion and the field portion, and the magnetic-pole portion slit and the outer-circumferential portion slit are disposed in such a manner that phases thereof are shifted from each other, and each of the arc-shaped plate-like magnetic bodies is mostly fixed on an outer circumferential surface of one of the fan-shaped magnetic bodies and is partly fixed on a portion of an outer circumferential surface of an adjacent one of the fan-shaped magnetic bodies.

2. A rotor for a permanent magnet-motor, comprising:
a magnetic pole portion that includes a first magnetic body formed in an annular shape; and
a field portion that is disposed adjacent to the magnetic pole portion in an axial direction, that includes a permanent magnet formed in an annular shape and having a multipole structure or a plurality of permanent magnets formed in an annular shape and having a monopole structure and second magnetic bodies, and that causes a magnetic flux generated by the permanent magnet to flow in the axial direction so as to generate magnetic poles on an outer circumferential surface of the magnetic pole portion, wherein the field portion is formed by disposing in an annular shape a plurality of fan-shaped permanent magnets with a field-portion slit being put therebetween, the permanent magnets each being sandwiched between the second magnetic bodies at both ends in a circumferential direction and being magnetized in a same circumferential direction.

3. The rotor for a permanent magnet motor according to claim 2, wherein the magnetic pole portion is formed by disposing a plurality of fan-shaped magnetic bodies in an annular shape with a magnetic-pole portion slit being put therebetween.

4. The rotor for a permanent magnet motor according to claim 3, wherein a flat plate-shaped permanent magnet that is magnetized in the circumferential direction to face toward the second magnetic body generating an N magnetic pole is disposed in the magnetic-pole portion slit.

5. The rotor for a permanent magnet motor according to claim 3, wherein arc-shaped plate-like magnetic bodies that are disposed in an annular shape and are spaced by an outer-circumferential portion slit having a same pitch as the magnetic-pole portion slit are fixed on an outer circumferential surface of the magnetic pole portion and the field portion.

6. The rotor for a permanent magnet motor according to claim 5, wherein the magnetic-pole portion slit and the outer-circumferential portion slit are disposed in such a manner that phases thereof are shifted from each other, and each of the arc-shaped plate-like magnetic bodies is mostly fixed on an outer circumferential surface of one of the fan-shaped magnetic bodies and is partly fixed on a portion of an outer circumferential surface of an adjacent one of the fan-shaped magnetic bodies.

7. A rotor for a permanent magnet motor, comprising:
a magnetic pole portion that includes a first magnetic body formed in an annular shape; and
a field portion that is disposed adjacent to the magnetic pole portion in an axial direction, that includes a permanent magnet formed in an annular shape and having a multipole structure or a plurality of permanent magnets formed in an annular shape and having a monopole structure and a second magnetic body, and that causes a magnetic flux generated by the permanent magnet to flow in the axial direction so as to generate magnetic poles on an outer circumferential surface of the magnetic pole portion, wherein the field portion is formed by disposing in an annular shape a plurality of fan-shaped permanent magnets magnetized in a circumferential direction with the second magnetic body being put therebetween in such a manner that directions of magnetization are alternately opposite to each other.

8. The rotor for a permanent magnet motor according to claim 7, wherein the magnetic pole portion is formed by disposing a plurality of fan-shaped magnetic bodies in an annular shape with a magnetic-pole portion slit being put therebetween.

9. The rotor for a permanent magnet motor according to claim 8, wherein a flat plate-shaped permanent magnet that is magnetized in the circumferential direction to face toward the second magnetic body generating an N magnetic pole is disposed in the magnetic-pole portion slit.

10. The rotor for a permanent magnet motor according to claim 8, wherein arc-shaped plate-like magnetic bodies that are disposed in an annular shape and are spaced by an outer-circumferential portion slit having a same pitch as the magnetic-pole portion slit are fixed on an outer circumferential surface of the magnetic pole portion and the field portion.

11. The rotor for a permanent magnet motor according to claim 10, wherein the magnetic-pole portion slit and the outer-circumferential portion slit are disposed in such a manner that phases thereof are shifted from each other, and each of the arc-shaped plate-like magnetic bodies is mostly fixed on an outer circumferential surface of one of the fan-shaped magnetic bodies and is partly fixed on a portion of an outer circumferential surface of an adjacent one of the fan-shaped magnetic bodies.

12. A rotor for a permanent magnet motor, comprising:
a magnetic pole portion that includes a first magnetic body formed in an annular shape; and
a field portion that is disposed adjacent to the magnetic pole portion in an axial direction, that includes a permanent magnet formed in an annular shape and having a multipole structure and a second magnetic body, and that causes a magnetic flux generated by the permanent magnet to flow in the axial direction so as to generate magnetic poles on an outer circumferential surface of the magnetic pole portion, wherein the magnetic pole portion is formed by disposing a plurality of fan-shaped magnetic bodies in an annular shape with a magnetic-pole portion slit being put therebetween, arc-shaped plate-like magnetic bodies that are disposed in an annular shape and are spaced by an outer-circumferential portion slit having a same pitch as the magnetic-pole portion slit are fixed on an outer circumferential surface of the magnetic pole portion and the field portion, the magnetic-pole portion slit and the outer-circumferential portion slit are disposed in such a manner that phases thereof are shifted from each other, and each of the arc-shaped plate-like magnetic bodies is mostly fixed on an outer circumferential surface of one of the fan-shaped magnetic bodies and is partly fixed on a portion of an outer circumferential surface of an adjacent one of the fan-shaped magnetic bodies, and the field portion is formed by forming in an annular shape the permanent magnet having a multipole structure that is magnetized in the axial direction.

13. A rotor for a permanent magnet motor, comprising:
a magnetic pole portion that includes a first magnetic body formed in an annular shape; and
a field portion that is disposed adjacent to the magnetic pole portion in an axial direction, that includes a permanent magnet formed in an annular shape and having a multipole structure and a second magnetic body, and that causes a magnetic flux generated by the permanent magnet to flow in the axial direction so as to generate magnetic poles on an outer circumferential surface of the magnetic pole portion, wherein the magnetic pole portion is formed by disposing a plurality of fan-shaped magnetic bodies in an annular shape with a magnetic-pole portion slit being put therebetween, arc-shaped plate-like magnetic bodies that are disposed in an annular shape and are spaced by an outer-circumferential portion slit having a same pitch as the magnetic-pole portion slit are fixed on an outer circumferential surface of the magnetic pole portion and the field portion, the magnetic-pole portion slit and the outer-circumferential portion slit are disposed in such a manner that phases thereof are shifted from each other, and each of the arc-shaped plate-like magnetic bodies is mostly fixed on an outer circumferential surface of one of the fan-shaped magnetic bodies and is partly fixed on a portion of an outer circumferential surface of an adjacent one of the fan-shaped magnetic bodies, and the field portion is formed by forming in an annular shape the permanent magnet having a multipole structure that is magnetized obliquely to the axial direction.

14. A rotor for a permanent magnet motor, comprising:
magnetic pole portions that each include a first magnetic body formed in an annular shape; and
a field portion that is disposed adjacent to the magnetic pole portions in an axial direction, that includes a permanent magnet formed in an annular shape and having a multipole structure and a second magnetic body, and that causes a magnetic flux generated by the permanent magnet to flow in the axial direction so as to generate magnetic poles on an outer circumferential surface of the magnetic pole portions, wherein the magnetic pole portions are each formed by disposing a plurality of fan-shaped magnetic bodies in an annular shape with a magnetic-pole portion slit being put therebetween, arc-shaped plate-like magnetic bodies that are disposed in an annular shape and are spaced by an outer-circumferential portion slit having a same pitch as the magnetic-pole portion slit are fixed on an outer circumferential surface of the magnetic pole portions and the field portion, the magnetic-pole portion slit and the outer-circumferential portion slit are disposed in such a manner that phases thereof are shifted from each other, and each of the arc-shaped plate-like magnetic bodies is mostly fixed on an outer circumferential surface of one of the fan-shaped magnetic bodies and is partly fixed on a portion of an outer circumferential surface of an adjacent one of the fan-shaped magnetic bodies, and the field portion includes
a first field portion that includes the second magnetic body in an annular shape that is disposed at an end in the axial direction and the permanent magnet formed in an annular shape and having a multipole structure, the permanent magnet being disposed adjacent to an inner side of the second magnetic body in the axial direction and being magnetized in the axial direction in such a manner that directions of magnetization are alternately opposite to each other, and a second field portion that is disposed between two of the magnetic pole portions, and includes the second magnetic body in an annular shape and a pair of permanent magnets formed in an annular shape and having a multipole structure, the permanent magnets being disposed adjacent to both sides of the second magnetic body and being magnetized in the axial direction in such a manner that directions of magnetization are alternately opposite to each other.

15. A rotor for a permanent magnet motor, comprising:
a magnetic pole portion that includes a first magnetic body formed in an annular shape; and
a field portion that is disposed adjacent to the magnetic pole portion in an axial direction, that includes a permanent magnet formed in an annular shape and having a multipole structure and a second magnetic body, and that causes a magnetic flux generated by the permanent magnet to flow in the axial direction so as to generate magnetic poles on an outer circumferential surface of the magnetic pole portion, wherein the magnetic pole portion is formed by disposing a plurality of fan-shaped magnetic bodies in an annular shape with a magnetic-pole portion slit being put therebetween, arc-shaped plate-like magnetic bodies that are disposed in an annular shape and are spaced by an outer-circumferential portion slit having a same pitch as the magnetic-pole portion slit are fixed on an outer circumferential surface of the magnetic pole portion and the field portion, the magnetic-pole portion slit and the outer-circumferential portion slit are disposed in such a manner that phases thereof are shifted from each other, and each of the arc-shaped plate-like magnetic bodies is mostly fixed on an outer circumferential surface of one of the fan-shaped magnetic bodies and is partly fixed on a portion of an outer circumferential surface of an adjacent one of the fan-shaped magnetic bodies, and the field portion is formed by forming in an annular shape a plurality of fan-shaped permanent magnets having a multipole structure that are magnetized in the axial direction.

16. A rotor for a permanent magnet motor, comprising:
a magnetic pole portion that includes a first magnetic body formed in an annular shape; and a field portion that is disposed adjacent to the magnetic pole portion in an axial direction, that includes a permanent magnet formed in an annular shape and having a multipole structure and a second magnetic body, and that causes a magnetic flux generated by the permanent magnet to flow in the axial direction so as to generate magnetic poles on an outer circumferential surface of the magnetic pole portion, wherein the magnetic pole portion is formed by disposing a plurality of fan-shaped magnetic bodies in an annular shape with a magnetic-pole portion slit being put therebetween, arc-shaped plate-like magnetic bodies that are disposed in an annular shape and are spaced by an outer-circumferential portion slit having a same pitch as the magnetic-pole portion slit are fixed on an outer circumferential surface of the magnetic pole portion and the field portion, the magnetic-pole portion slit and the outer-circumferential portion slit are disposed in such a manner that phases thereof are shifted from each other, and each of the arc-shaped plate-like magnetic bodies is mostly fixed on an outer circumferential surface of one of the fan-shaped magnetic bodies and is partly fixed on a portion of an outer circumferential surface of an adjacent one of the fan-shaped magnetic bodies, and the field portion is formed by forming in an annular shape a plurality of fan-shaped permanent magnets having a multipole structure that are magnetized obliquely to the axial direction.

17. A rotor for a permanent magnet motor, comprising:

magnetic pole portions that each include a first magnetic body formed in an annular shape; and a field portion that is disposed adjacent to the magnetic pole portions in an axial direction, that includes a permanent magnet formed in an annular shape and having a multipole structure and a second magnetic body, and that causes a magnetic flux generated by the permanent magnet to flow in the axial direction so as to generate magnetic poles on an outer circumferential surface of the magnetic pole portions, wherein the magnetic pole portions are each formed by disposing a plurality of fan-shaped magnetic bodies in an annular shape with a magnetic-pole portion slit being put therebetween, arc-shaped plate-like magnetic bodies that are disposed in an annular shape and are spaced by an outer-circumferential portion slit having a same pitch as the magnetic-pole portion slit are fixed on an outer circumferential surface of the magnetic pole portions and the field portion, the magnetic-pole portion slit and the outer-circumferential portion slit are disposed in such a manner that phases thereof are shifted from each other, and each of the arc-shaped plate-like magnetic bodies is mostly fixed on an outer circumferential surface of one of the fan-shaped magnetic bodies and is partly fixed on a portion of an outer circumferential surface of an adjacent one of the fan-shaped magnetic bodies, and the field portion includes a first field portion that includes the second magnetic body in an annular shape that is disposed at an end in the axial direction and a plurality of fan-shaped permanent magnets formed in an annular shape and having a multipole structure, the permanent magnets being disposed adjacent to an inner side of the second magnetic body in the axial direction and being magnetized in the axial direction in such a manner that directions of magnetization are alternately opposite to each other, and a second field portion that is disposed between two of the magnetic pole portions, and includes the second magnetic body in an annular shape and two groups of a plurality of fan-shaped permanent magnets formed in an annular shape and having a multipole structure, the permanent magnets being disposed adjacent to both sides of the second magnetic body and being magnetized in the axial direction in such a manner that directions of magnetization are alternately opposite to each other.

* * * * *